(12) United States Patent
Cai et al.

(10) Patent No.: US 6,669,184 B2
(45) Date of Patent: Dec. 30, 2003

(54) COMPOSITE WAVE RING SPRING

(75) Inventors: Haimian Cai, Ann Arbor, MI (US); Gary Walter Leevy, Farmington Hills, MI (US); Lakshmana Gummadi, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/157,321

(22) Filed: May 29, 2002

(65) Prior Publication Data

US 2003/0222385 A1 Dec. 4, 2003

(51) Int. Cl.[7] ................................................. F16F 1/20
(52) U.S. Cl. ........................................ 267/162; 267/180
(58) Field of Search ............................... 267/162, 180, 267/181, 164, 165, 167, 182, 47, 52, 86, 85, 92

(56) References Cited

U.S. PATENT DOCUMENTS

| | | | |
|---|---|---|---|
| 101,724 A | | 4/1870 | French |
| 361,298 A | | 4/1887 | Kilmer |
| 1,139,732 A | * | 5/1915 | Slick ............................. 267/2 |
| 2,534,123 A | * | 12/1950 | Hasselhorn ................. 148/529 |
| 2,551,505 A | * | 5/1951 | Olson .......................... 267/28 |
| 2,587,016 A | | 2/1952 | Watts |
| 2,982,323 A | * | 5/1961 | Vossloh et al. ............. 411/153 |
| 3,391,910 A | * | 7/1968 | Prahl ........................... 261/94 |
| 3,674,251 A | * | 7/1972 | Tirabassi .................... 267/162 |
| 4,901,987 A | | 2/1990 | Greenhill et al. |
| 5,160,121 A | * | 11/1992 | Bartholomew .............. 267/136 |
| 5,622,358 A | | 4/1997 | Komura et al. |
| 5,639,074 A | | 6/1997 | Greenhill et al. |
| 5,747,140 A | * | 5/1998 | Heerklotz .................... 428/131 |
| 5,803,444 A | | 9/1998 | Shibuya et al. |
| 6,068,250 A | | 5/2000 | Hawkins et al. |
| 6,250,618 B1 | | 6/2001 | Greenhill |
| 6,254,071 B1 | | 7/2001 | Greenhill |
| 6,408,631 B1 | * | 6/2002 | Sylvia ............................. 62/6 |

\* cited by examiner

Primary Examiner—Jack Lavinder
Assistant Examiner—Benjamin A Pezzlo
(74) Attorney, Agent, or Firm—Brinks Hofer Gilson & Lione

(57) ABSTRACT

A compression spring comprising a plurality of composite wave rings stacked and attached to one another in crest to crest configuration. Each of the wave rings has a plurality of alternating peaks and troughs wherein one peak and one adjacent trough define a wave having a wave height measured axially from the peak to the trough and the wave heights vary such that the compression spring provides a varying spring rate as the compression spring is compressed.

12 Claims, 6 Drawing Sheets

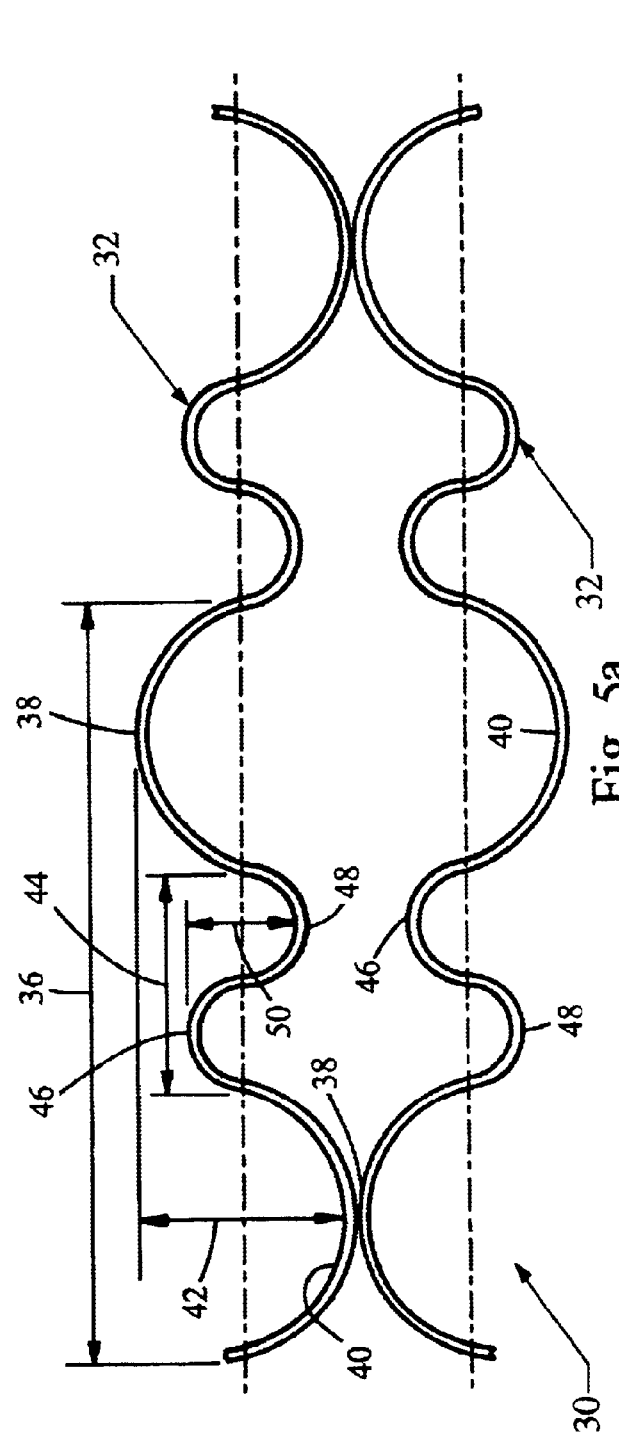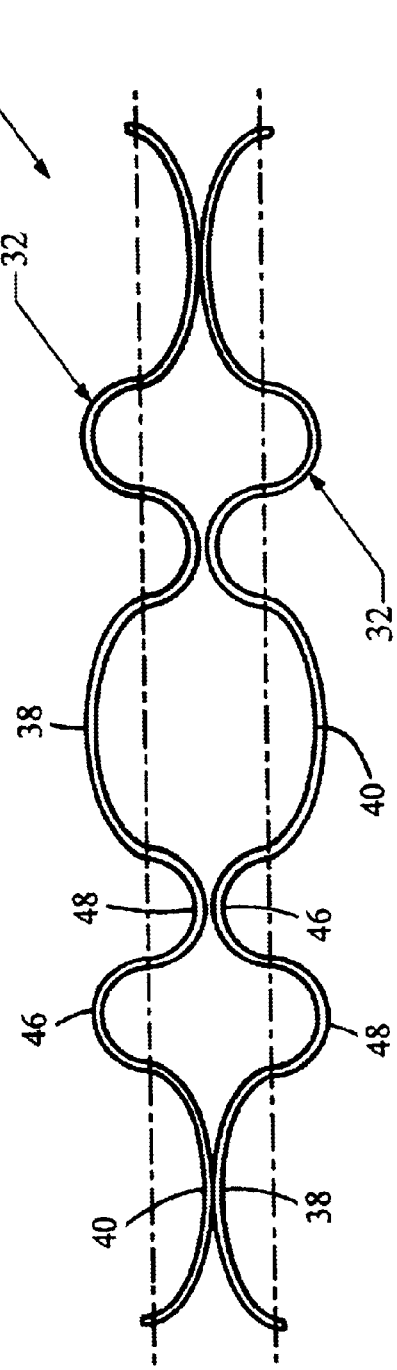
Fig. 5a
Fig. 5b

COMPOSITE WAVE RING SPRING

TECHNICAL FIELD

The present invention generally relates to a spring used in the suspension system of an automobile. More specifically, the present invention relates to a composite spring made from several wave rings stacked on one another in a crest to crest configuration.

BACKGROUND

Traditionally, steel coil springs are used to provide support and dampening within a vehicle suspension system. Steel coil springs are heavy, and have a particular spring rate that is only effective within a certain range of compressive forces. If the force is too large, then the spring may bottom out, and if the force is too small, then the stiffness of the spring will not allow the spring to compress. Therefore, there is a need for a compression spring which is lighter and more resistant to corrosion than traditional steel coil springs and can provide multiple spring rates under compressive loading.

BRIEF DESCRIPTION OF THE DRAWINGS

FIG. 5a is a schematic view of two aligned waves of a second preferred embodiment;

FIG. 5b is a view similar to FIG. 6 wherein the waves have been compressed under a load;

DETAILED DESCRIPTION OF THE PREFERRED EMBODIMENTS

The following description of the preferred embodiments of the invention is not intended to limit the scope of the invention to these preferred embodiments, but rather to enable any person skilled in the art to make and use the invention.

Figure 1:
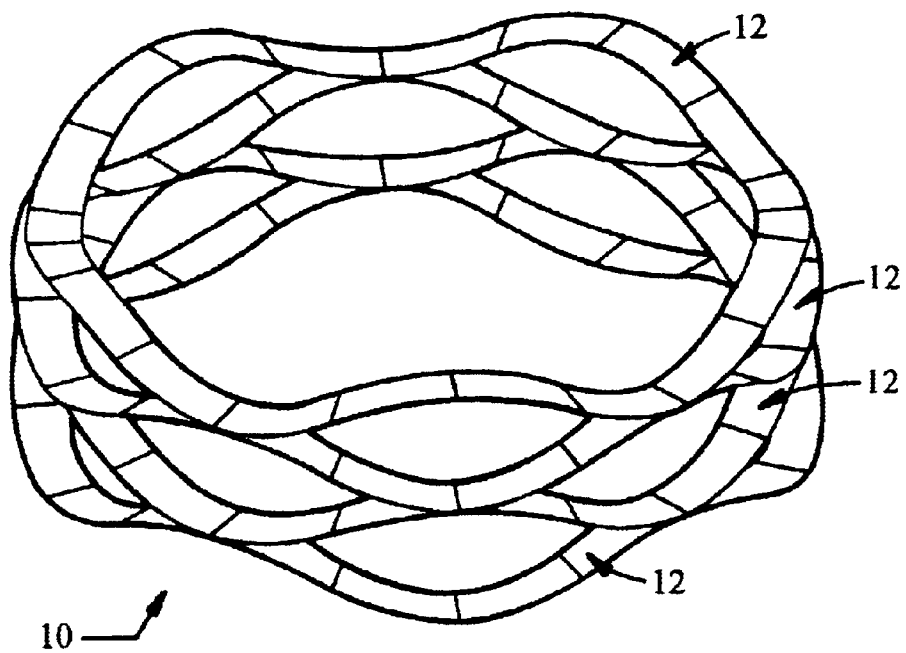
FIG. 1 is a perspective view of a spring comprising a plurality of wave rings stacked upon one another in crest to crest engagement.
Figure 2:
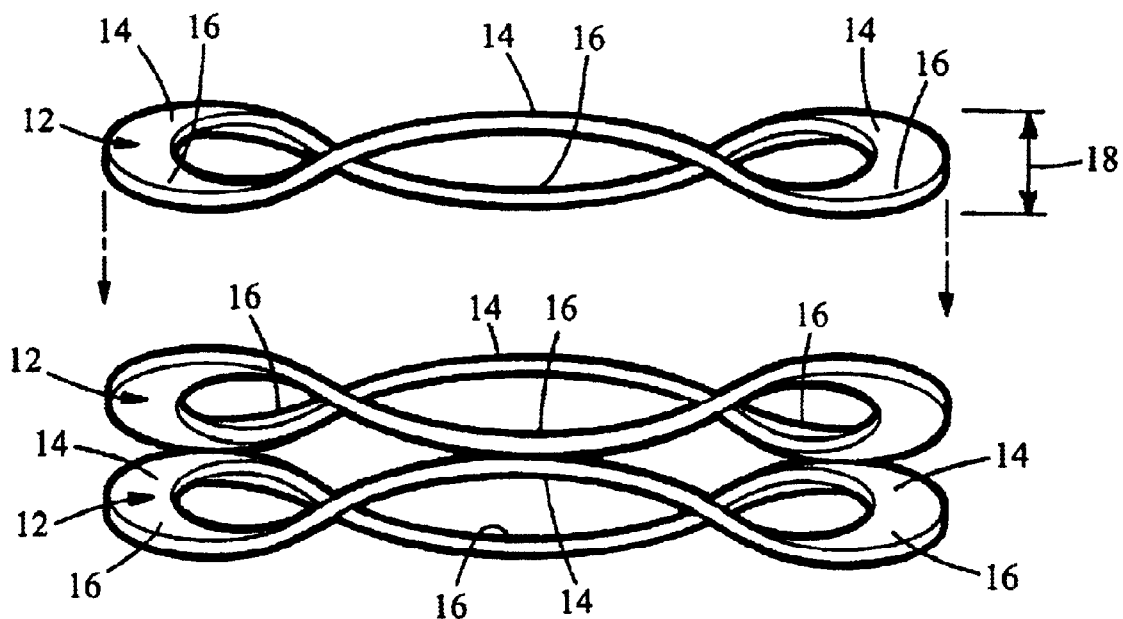
FIG. 2 is a side view showing wave rings stacked upon one another in crest to crest engagement.

Referring to FIG. 1, a compression spring is shown generally at 10. The compression spring 10 includes a plurality of wave rings 12 which are stacked on top of one another in a crest to crest configuration. Referring to FIG. 2, each of the wave rings 12 are formed from a single piece of composite material and define a plurality of waves. Preferably, the wave rings are made of a polymer such as plastic or other suitable composite, and molded to the appropriate shape. Each wave comprises an upward pointing peak 14 and a downward pointing trough 16. The axial distance measured from the peak 14 to the trough 16 of a wave defines a wave height 18 of that wave.

Figure 3A:
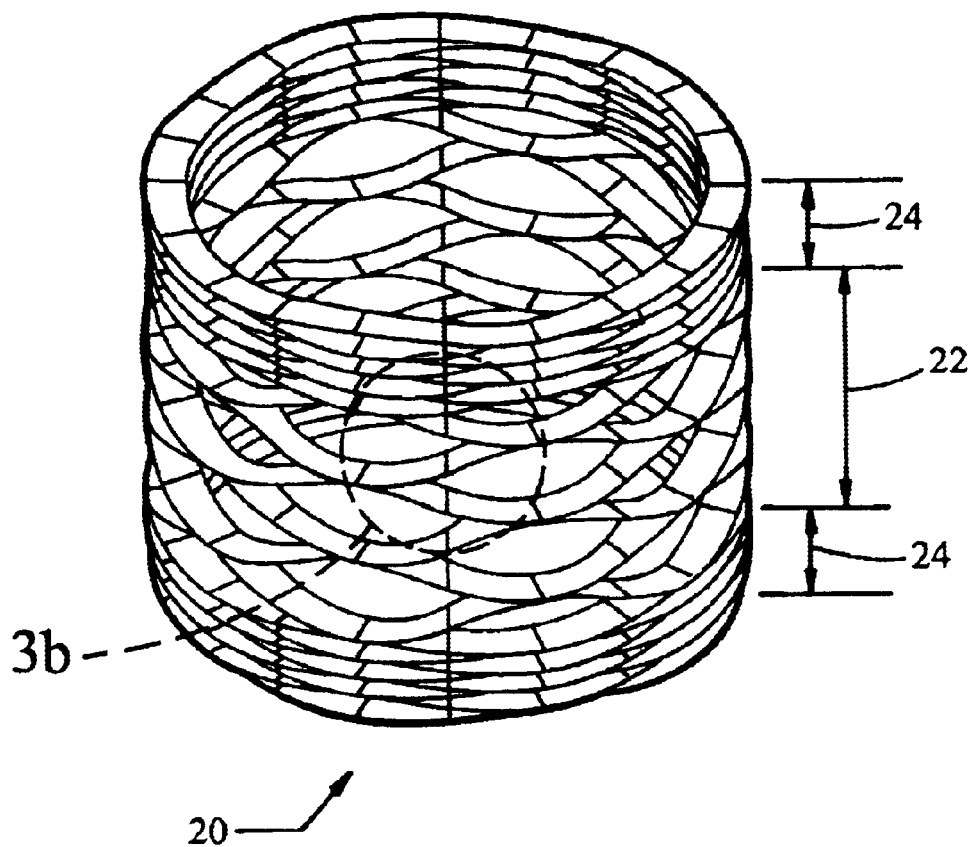
FIG. 3a is a perspective view of a first preferred embodiment.
Figure 3B:
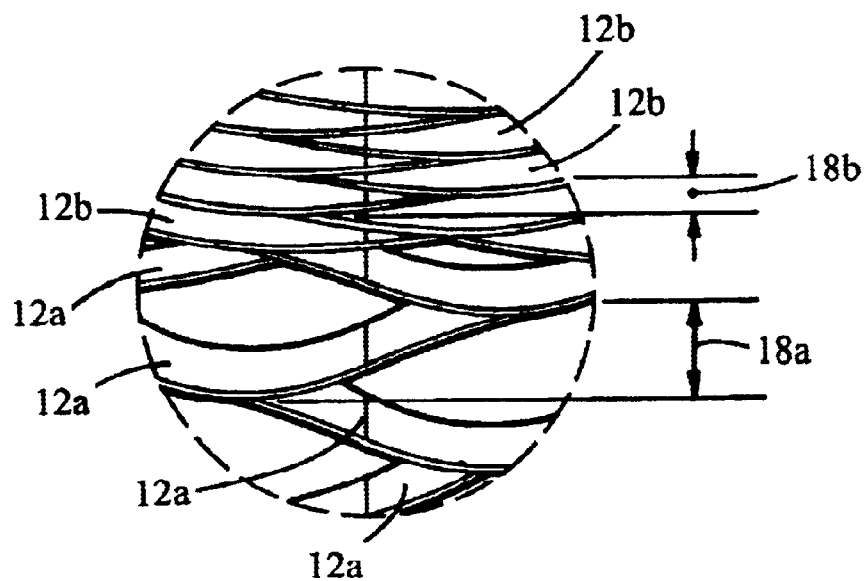
FIG. 3b is an enlarged view of a portion of FIG. 3.

Referring to FIG. 3a, a in a first preferred embodiment, a compression spring 20 includes a plurality of wave rings 12 wherein each individual wave ring 12 comprises waves of the same wave height 18, however the wave height 18 of the waves varies from one wave ring 12 to another. As shown, the compression spring 20 includes a first section 22 having a plurality of wave rings 12a and a second section 24 having a plurality of wave rings 12b. Referring to FIG. 3b, the wave rings 12a of the first section 22 have a first wave height 18a and the wave rings 12b of the second section 24 have a second wave height 18b. As shown in FIG. 3a, the first section 22 is a central portion of the compression spring 10 and the second section 24 comprises opposing end portions of the compression spring 10. The wave height 18b of the wave rings 12b in the second section 24 is less than the wave height 18a of the wave rings 12a in the first section 22.

The shallow waves of the wave rings 12b within the second section 24 are less stiff than the taller wave rings 12a of the first section 22. Therefore, as the compression spring 20 is compressed, the wave rings 12b within the second section 24 will begin to compress before the wave rings 12a within the first section 22. Eventually, increasing compressive forces on the compression spring 20 will cause the wave rings 12b within the second section 24 to reach a point at which the waves cannot compress any further, whereby the second section 24 will behave as a solid, with no spring response qualities. If more force is exerted upon the compression spring 20, then the wave rings 12a within the first section 22 will begin to compress.

By having multiple discrete sections of wave rings 12 having different wave heights 18, the compression spring 20 can be designed to exhibit multiple spring rates. As described above, the compression spring 20 provides a first spring rate as the wave rings 12b within the second section 24 are compressed. At higher compressive forces, the wave rings 12b within the second section 24 "bottom out", and the wave rings 12a of the first section 22, which are stiffer, begin to compress. Further, the first preferred embodiment 20 can be practiced with any number of discrete sections all having wave rings 12 of different wave heights 18, thereby providing a wide range of effective spring rates.

Figure 4A:
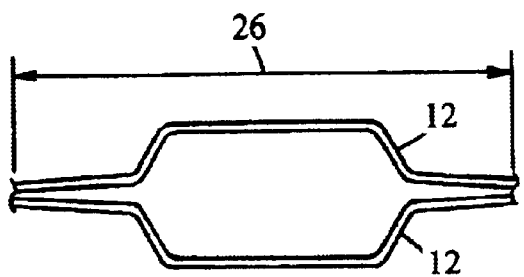
FIG. 4a is a schematic view of a pair of aligned waves having a stepped profile.
Figure 4B:
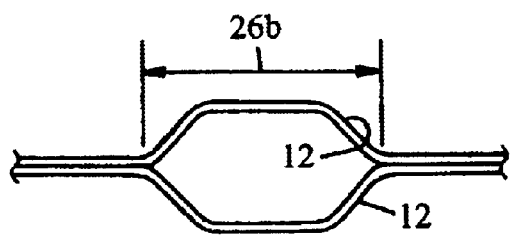
FIG. 4b is a view similar to FIG. 4 wherein the waves have been compressed.
Figure 4C:
FIG. 4c is a schematic view of a pair of aligned waves having a smooth profile.
Figure 4D:
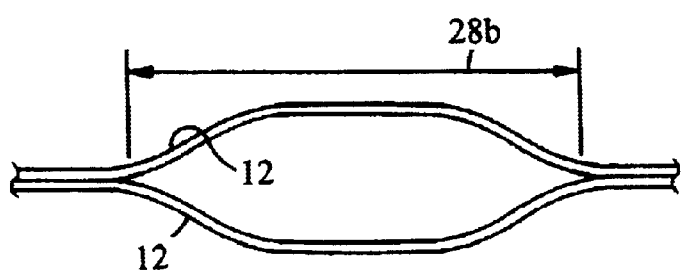
FIG. 4d is a view similar to FIG. 4b wherein the waves have been compressed under a load.
Figure 4E:
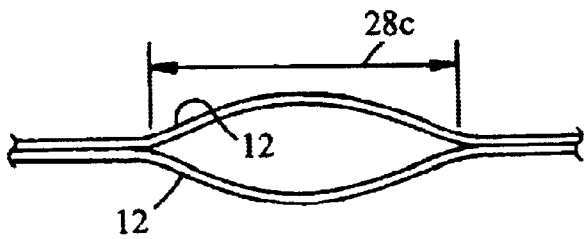
FIG. 4e is a view similar to FIG. 4c wherein the waves have been compressed under a larger load than in FIG. 4c.

As each individual wave ring 12 compresses, that particular wave ring 12 can exhibit either dual spring rate response or variable spring rate response. Referring to FIG. 4a, a schematic of a pair of aligned wave rings 12 is shown. Each of the wave rings 12 has an effective spring length 26. As the wave rings 12 are compressed, the waves begin to compress and portions of the wave rings 12 come into contact. This reduces the amount of flexible length of the waves, thereby forming a shortened effective spring length 26b, as shown in FIG. 4b. When the waves are compressed to a shortened effective spring length 26b, the stiffness of the waves increases. As shown in FIGS. 4a and 4b, the waves 14 can have a stepped profile whereby the effective length 26 of the waves can only be shortened by a certain amount, thereby providing a dual spring rate. Alternatively, the waves 14 can have a smooth profile whereby as the load increases, an un-compressed effective length 28 continues to decrease as the load increases, as shown in FIG. 4c. Under a large load the waves provide a shorter effective length 28b, as shown in FIG. 4d, and under an even larger load, the waves provide an even shorter effective length 28c, as shown in FIG. 4e, thereby providing a spring rate that varies as the wave rings 12 are compressed.

A second preferred embodiment 30 includes wave rings 32 having waves of varying wave heights, in order to provide a dual spring rate response as the compression spring 30 is compressed. Referring to FIG. 5a, a schematic of the wave profile of two adjacent wave rings 32 is shown. Each of the wave rings 32 have a plurality of primary waves 36 each comprising a crest 38 and a trough 40, defining a wave height 42 of the primary waves 36. Each of the primary waves 36 includes a secondary wave 44 nested between the crest 38 and the trough 40 of the primary wave 36. Each of the secondary waves 44 comprises a crest 46 and a trough 48 defining a wave height 50. The wave rings 32 are stacked onto one another in a crest to crest configuration, wherein only the crests 38 and troughs 40 of the primary waves 36 engage one another.

As force is exerted upon the compression spring 30, the primary waves 36 will provide a first spring rate, a shown in FIG. 5a. Eventually, the primary waves 36 will compress to a point where the secondary waves 44 will engage one another in a crest to crest engagement similarly to the primary waves 36 as shown in FIG. 5b. The additional stiffness added by the secondary waves 44 causes the compression spring 30 to provide a second spring rate response to continued loading.

In either embodiment, the adjacent wave rings 12, 32 can be attached to one another at either one or multiple crest to crest engagement points. By having the adjacent wave rings 12, 32 attached at only one crest to crest engagement point, the wave rings 12, 32 have more freedom to deform as they are compressed. Alternatively, if the wave rings 12, 32 are attached at all of the crest to crest engagement points, the wave rings 12, 32 will not have as much freedom, and will consequently be stiffer and have a higher spring rate.

Figure 6:
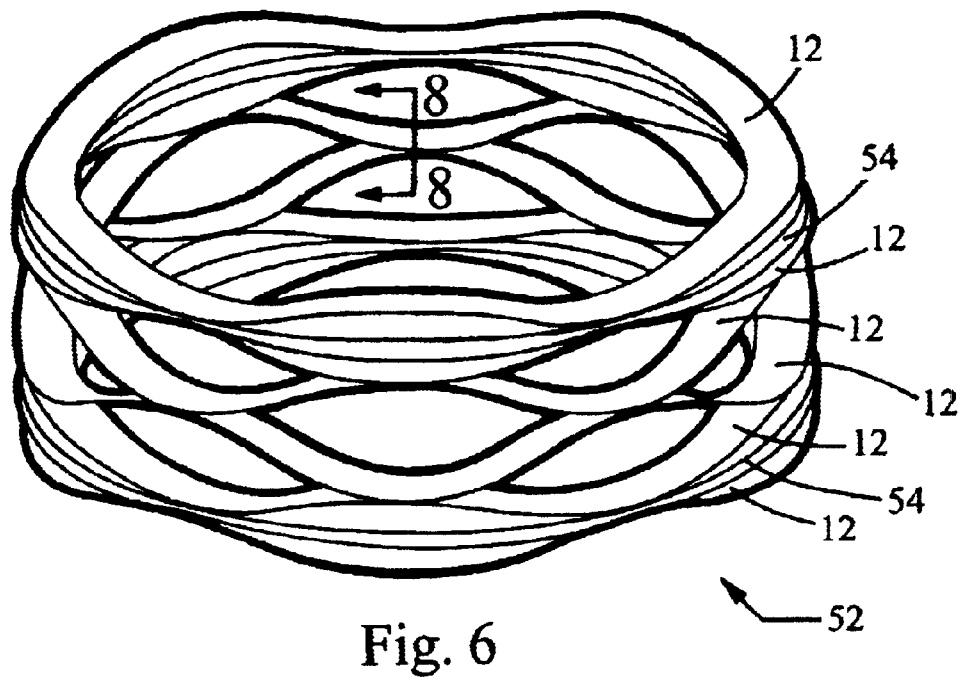
FIG. 6 is a perspective view of a third preferred embodiment.

A third preferred embodiment is shown generally at 52 in FIG. 6. In the third preferred embodiment 52, adjacent wave rings 12 have an intermediate ring 54 positioned between them. The intermediate ring 54 can be either flat or waved, wherein the wave height of the intermediate ring 54 is smaller than the wave height 18 of the wave rings 12. The intermediate ring 54 will affect the spring dynamics of the compression spring 52. The intermediate ring 54 can be made of the same material as the wave rings, wherein the presence of the intermediate ring 52 changes the spring rate of the compression spring 52. Alternatively, the intermediate ring 52 can also be made form a material that is compressive, wherein the intermediate ring 52 will act as a dampener between the wave rings 12.

In all of the preferred embodiments 20, 30, 52, it is preferable for the wave rings 12, 32 to have an odd number of waves. In the second preferred embodiment 30, the wave rings 32 will have an odd number of primary waves 36, however, since each primary wave 36 includes a secondary wave 44 nested therein, the total number of waves will be even, but the number of primary waves 36 will be odd.

Figure 7:
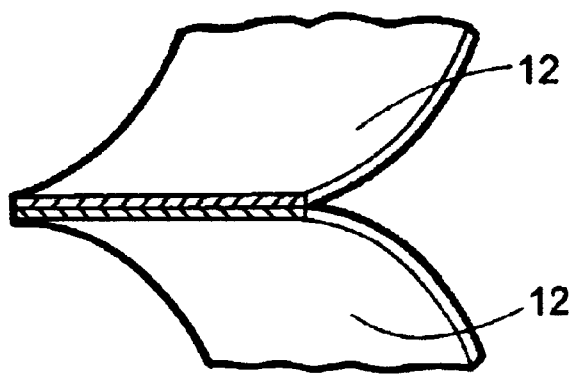
FIG. 7 is a sectional view taken along line 8—8 of FIG. 7 showing a point of crest to crest engagement of two flat wave rings.
Figure 8:
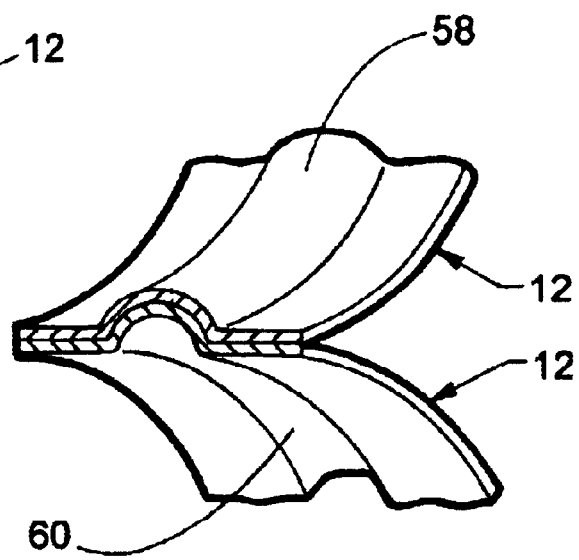
FIG. 8 is a view similar to FIG. 8 wherein the wave rings include features to make the wave rings self-aligning when stacked upon one another.

In a variation of any of the preferred embodiments 20, 30, 52, the wave rings 12, 32 can include features which allow the wave rings 12, 32 to interlock. These features allow the wave rings 12, 32 to be self-aligning when stacked upon one another. Referring to FIG. 7, a cross section of a point of crest to crest engagement between two wave rings 12 is shown wherein each of the wave rings is flat, and referring to FIG. 8, a cross section of a point of crest to crest engagement between two wave rings 12 is shown wherein each wave ring 12 includes a ridge formed therein which runs circumferentially about the wave rings 12. The ridge defines an upwardly extending rib 58 on the top surface of the wave rings 12 and a channel 60 within the bottom surface of the wave rings 12. When the wave rings 12 are stacked on one another in crest to crest fashion, the rib 58 on the top surface of one of the wave rings 12 fits within the channel 60 formed within the bottom surface of the adjacent wave ring 12. The engagement of the ribs 58 and channels 60 will provide side to side engagement of the wave rings 12 to keep the wave rings aligned with one another.

Figure 9A:
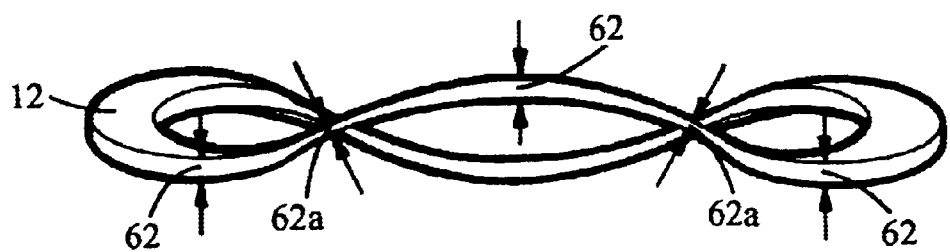
FIG. 9a and 9b are side views of a single wave ring having a varying thickness annularly about the wave ring.
Figure 9B:
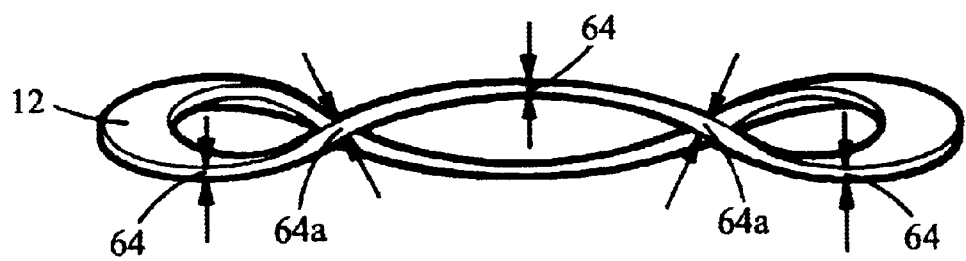
Figure 10:
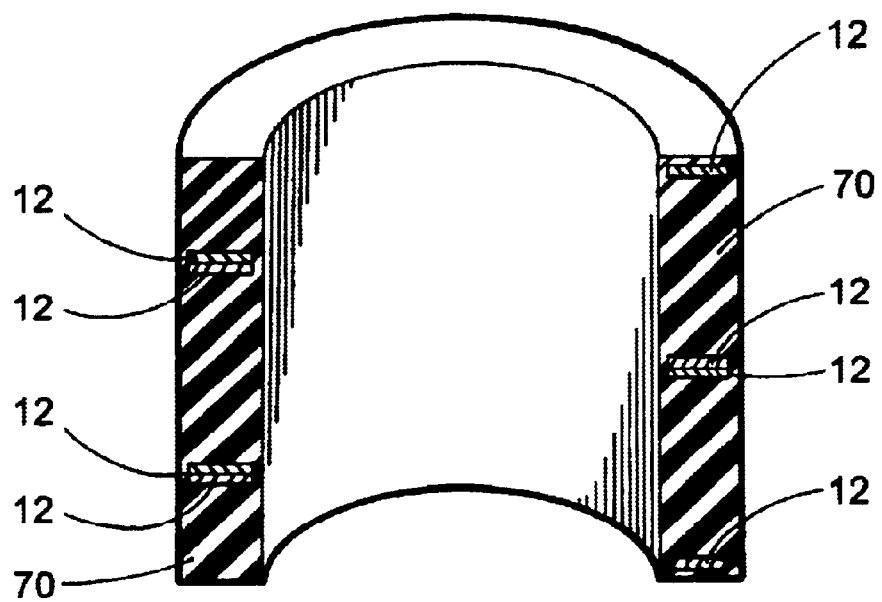
FIG. 10 is a sectional view of a compression spring wherein the spring is embedded within a support material.

Preferably, the thickness of the wave rings 12 is uniform, as shown in FIG. 2. Alternatively however, the thickness of the wave rings 12 can vary annularly about the wave rings as shown in FIGS. 9a and 9b. By varying the thickness of the wave rings, the dynamics of the spring can be affected. For example the thickness of the wave rings 12 varies wherein the wave rings 12 have a first thickness 62 at the points of crest to crest engagement, and gradually decrease to a second thickness 62a, which is less than the first thickness 62, between the points of crest to crest engagement, as shown in 9a. Alternatively, the wave rings can have a first thickness 64 at the points of crest to crest engagement and gradually increase to a second thickness 64a, which is greater than the first thickness 64, between the points of crest to crest engagement, as shown in FIG. 9b.

When in use, particularly on an automobile, where the spring 20, 30, 52 can be exposed to hostile environments, it is desirable to protect the spring 20, 30, 52 from being struck by debris and to prevent debris from being caught between the waves. Referring to FIG. 11, the spring of any of the preferred embodiments 20, 30, 52 can be embedded within a material 70 which will allow compression of the waves, but will prevent debris from striking the spring 20, 30, 52 and from being lodged between the waves. Preferably the material 70 is light and provides little resistance to compression, however the material 70 could also be some other flexible material which will allow compression and provide dampening as well.

The foregoing discussion discloses and describes three preferred embodiments. One skilled in the art will readily recognize from such discussion, and from the accompanying drawings and claims, that changes and modifications can be made to the preferred embodiments without departing from the true spirit and fair scope of the inventive concepts as defined in the following claims. The preferred embodiments have been described in an illustrative manner, and it is to be understood that the terminology which has been used is intended to be in the nature of words of description rather than of limitation.

What is claimed is:

1. A compression spring comprising:
   a plurality of composite wave rings stacked and attached to one another in a crest to crest configuration;
   each of said wave rings having a plurality of alternating peaks and troughs wherein one peak and one adjacent trough define a wave having a wave height measured axially from said peak to said trough, each of said waves within a particular wave ring having the same wave height;

said wave heights varying between individual ones of said wave rings such that said compression spring provides a varying spring rate as said compression spring is compressed;

each of said wave rings further including a ridge formed therein to allow a top surface of one wave ring to inter-lock with a bottom surface of an adjacent wave ring, thereby making the wave rings self-aligning.

2. The compression spring of claim 1 wherein adjacent wave rings are attached to one another at a trough of one wave ring and a peak of an adjacent wave ring.

3. The compression spring of claim 1 further comprising an intermediate ring positioned between two adjacent wave rings.

4. The compression spring of claim 3 wherein said intermediate ring is substantially flat.

5. The compression spring of claim 4 wherein said intermediate ring includes a plurality of alternating peaks and troughs wherein one peak and one adjacent trough define a wave having a wave height measured axially from said peak to said trough, each of said waves within said intermediate wave ring having the same wave height, said wave height of said waves of said intermediate ring being less than the wave height of said two adjacent wave rings.

6. The compression spring of claim 5 wherein said intermediate ring is made from a different material than said wave rings.

7. The compression spring of claim 1 wherein each of said wave rings has an odd number of waves.

8. The compression spring of claim 1 wherein said wave rings define a thickness that is uniform circumferentially about said wave rings.

9. The compression spring of claim 1 wherein said wave rings define a thickness that varies circumferentially about said wave rings.

10. The compression spring of claim 1 including a first plurality of wave rings having waves of a first wave height and a second plurality of wave rings having waves of a second wave height, said first wave height being larger than said second wave height.

11. The compression spring of claim 1 wherein said waves within a particular wave rings have varying wave heights relative to one another.

12. The compression spring of claim 1 further comprising a sheath which encapsulates said wave rings and fills in between said wave rings to provide dampening of the compression of said wave rings.

* * * * *